S. BURGESS.
Harrows.

No. 153,214. Patented July 21, 1874.

Witnesses,
Clarence Thurlow
James Thurlow

Schuyler Burgess
by E. Thurlow
his atty

UNITED STATES PATENT OFFICE.

SCHUYLER BURGESS, OF MONICA, ILLINOIS.

IMPROVEMENT IN HARROWS.

Specification forming part of Letters Patent No. 153,214, dated July 21, 1874; application filed May 4, 1874.

*To all whom it may concern:*

Be it known that I, SCHUYLER BURGESS, of Monica, in the county of Peoria and in the State of Illinois, have invented an Improvement in Harrows; and do hereby declare that the following is a full, clear, and exact description thereof, reference being had to the annexed drawings, making a part of this specification, in which like letters of reference refer to like parts, and in which—

Figure 1:
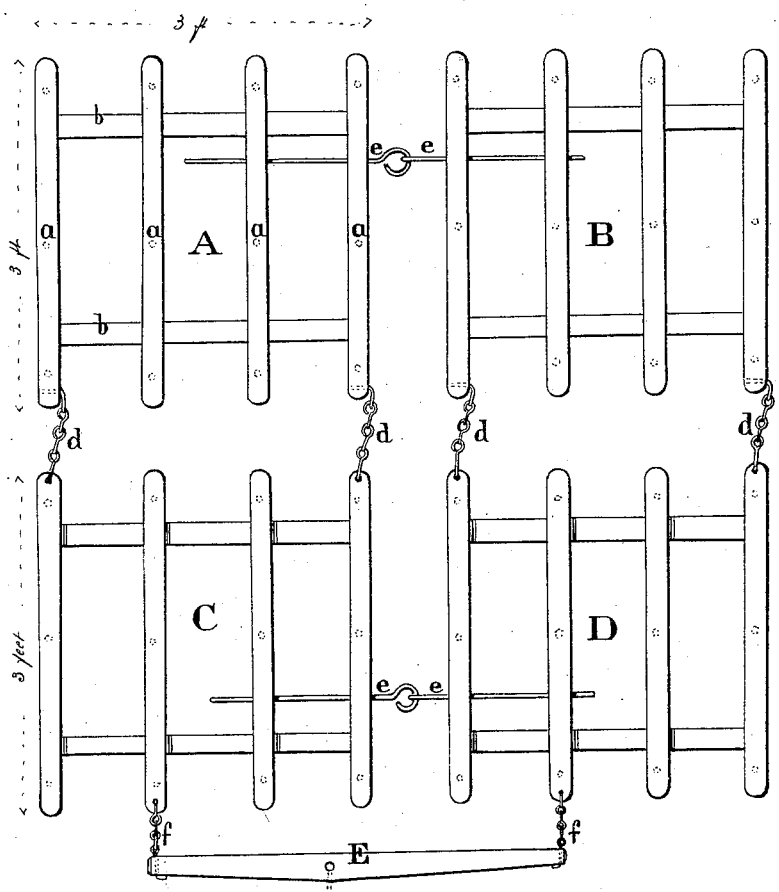
Figure 2:
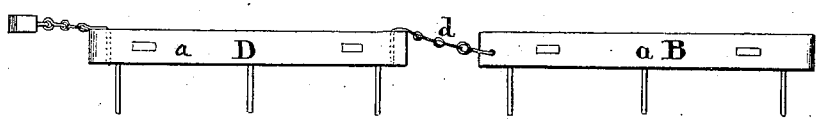
Figure 3:
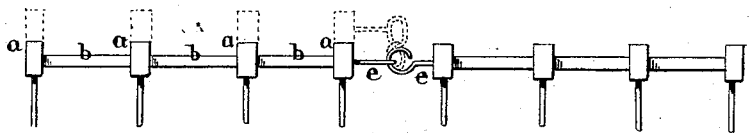

Figure 1 represents a plan view; Fig. 2, a side elevation; Fig. 3, front elevation.

This harrow has four independent sections, each of a square form, arranged also in a square form. The divisions are transversely connected together by chains to allow of latitude of motion to each division. These coupled divisions are hinged down the center, or in the space between them, from front to rear by hinges, or interlocked hooks or rods, or similar hinged connections, so that one half of the harrow may be folded upon the other half to render the whole more portable or fit it for storage, or to make it more compact when not in use. It is designed to be drawn forward diagonally by an attached draft-bar, which is attached at either end at two places, to the right or to the left of the center of the harrow front, in such a manner that no portion of the soil passed over is untouched by the pendent teeth of the same.

The following is a description of one of the most effective forms of my invention, reference being had to the drawings.

A B C D represent four independent harrow-sections, each division consisting of fore and aft teeth-bars *a a a a*, intersected and united by cross-braces *b b*. The front and rear sections are united at the respective opposite corners by chains *d d d d*, and the right and left half of the harrow are united by rods terminating in hooks *e e e e*, so that one half will readily fold upon the other when it is desired to occupy less room when not in use. (See dotted lines, Fig. 3.) The hooked rods *e e e e* are capable of being extended or drawn in by their retention in the holes in the bars *a a*. The teeth are so inserted in the bars *a a*, and the draft-bar E so attached, as to jointly to operate in harrowing every inch of soil over which the harrow passes. E represents the draft-bar, which is attached at both ends, respectively, to one of the bars *a a* of the front sections C D, by chains *f f*, out of the central line of the whole harrow, so as to operate to draw the same diagonally, as aforesaid.

The operation of this four-sectioned harrow is as follows: Being made in four sections, each independent to a great extent of the others, it readily accommodates itself to the lay of the soil, and the more readily frees itself from accumulation of stalks or similar obstructions by the "tilting" action of each section, in turn, in going over ridges in the soil, by which the rear of each section is elevated, allowing the stalks to drop clear of the teeth. All this is accomplished by the hinging of the right and left double sections together down the center, and by uniting the front and rear double sections by chains, (of several links in length,) to allow of free lateral motion and the tipping or tilting motion before mentioned. It is drawn by the attachment of the bar E to the right or left of the center or hinge line of the harrow, to cause it to advance in a line diagonal to its axis.

What I claim as my invention is—

1. The combination of the harrow-sections A B C D, united by chains *d* and eyebolt-rods *e*, in the manner and for the purpose specified.

2. The combination of the harrow-divisions A B C D, the sections A C being united by the hooks *e e e e* to the sections B D, and the sections A B to the sections C D by the chains *d d d d*, the chains *f f*, and draft-bar E, substantially as described.

In testimony that I claim the foregoing harrow I have hereunto set my hand this 9th day of April, 1874.

SCHUYLER BURGESS.

Witnesses:
CLARENCE THURLOW,
H. W. WELLS.